A. CARSON.
Shovel-Plow.
No. 64,747.
Patented May 14, 1867.
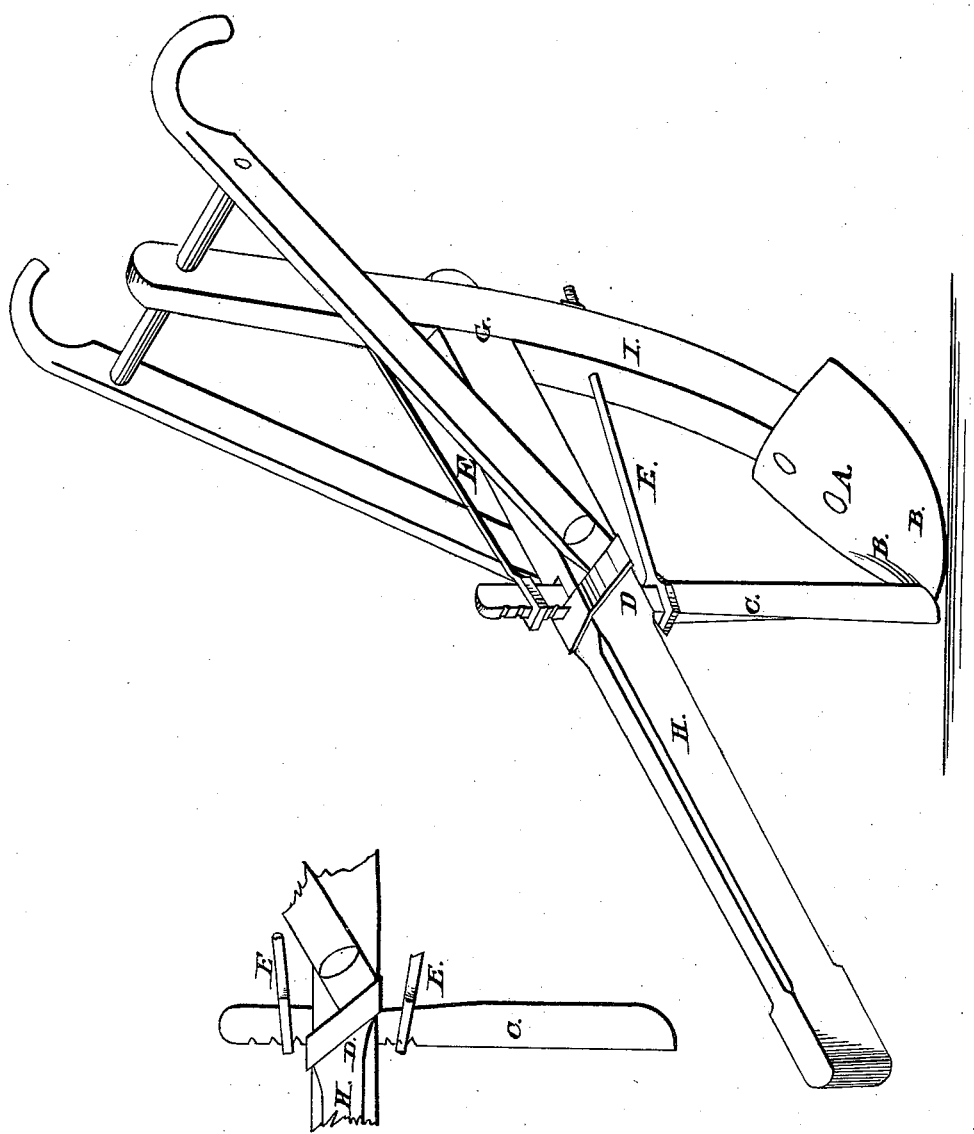
Witnesses:
J. A. Curtis
Thos. C. Connolly
Inventor:
Andrew Carson

United States Patent Office.

ANDREW CARSON, OF MEMPHIS, TENNESSEE.

Letters Patent No. 64,747, dated May 14, 1867.

PLOUGH.

The Schedule referred to in these Letters Patent and making part of the same.

TO ALL WHOM IT MAY CONCERN:

Be it known that I, ANDREW CARSON, of Memphis, in the county of Shelby, and State of Tennessee, have invented new and useful improvements in Ploughs; and I do hereby declare that the following is a full and complete description of the construction and operation of the same, reference being had to the accompanying drawings, making part of this specification, in which—

Figure 1 is a perspective view; and.
Figure 2 a detached section.
Like letters refer to like parts.

The object of my invention is to so construct a plough that will, in new ground, run with more ease to both man and horse, and cut the roots more thoroughly than the old-fashioned plough, with the steel laid on the back of the share and the edge turned backward, could do.

A represents the shovel or share with the steel laid on the front side; B represents that portion of the shovel or share edges that is turned forward for the purpose of cutting roots; C represents the coulter, with notches in the front edge of the upper end of the bar; D represents the diagonal band around the beam H and coulter C; E represents the lower brace or rod, with a slot in the front end through which the coulter C passes; H represents the beam; I represents the standard. By turning a proper portion of the edge B forward for the purpose of running under the roots and cutting upwards, which keeps the plough down in the furrow, causes the plough to run steady, making it easier on the ploughman; and as it is easier to cut than to break roots, the plough runs easier to the horse than the old-fashioned plough with the edge turned backwards, in which case the plough has to break instead of cutting the roots. The lower brace or rod E is so arranged as to hold the coulter C secure and fast in its place by hooking the upper edge of the diagonal band D into one of the notches on the coulter C, and drawing the back of the coulter C against the lower edge of the band D by means of the brace or rod E. I thus secure the coulter C in its place, and thoroughly brace the plough with one screw. The use of the upper brace or rod F is to prevent the lower brace or rod E from straining the plough at the joint G while tightening the coulter C with the brace or rod E.

In my experiment with the above-described plough I have improved it until, in my opinion, it is a superior plough for new and rooty ground, and particularly the new cane ground of the South. The plough cuts the roots in three places in each furrow, and turns half the furrow to each side, and the half furrow on the left side is turned over a second time when the plough comes round again, which causes the ground to be thoroughly pulverized.

What I claim as my improvement, and desire to secure by Letters Patent, is—

1. The herein-described construction of the shovel or share A, with the steel laid on the front side, and its turned-up edges B, in combination with the coulter C.

2. I claim the diagonal band D, constructed as described and shown.

3. I claim the coulter C with its notches.

4. I claim the braces E and F, in their relation to the beam H and standard I, all arranged as and for the purposes specified.

ANDREW CARSON.

Witnesses:
F. A. CURTIS,
THOS. C. CONNOLLY.